Jan. 12, 1960

N. COLE 2,920,405

COMBINATION GRADING TOOL

Filed July 9, 1958

INVENTOR.
NORMAN COLE
BY
*Francis E. Blake*
ATTORNEY

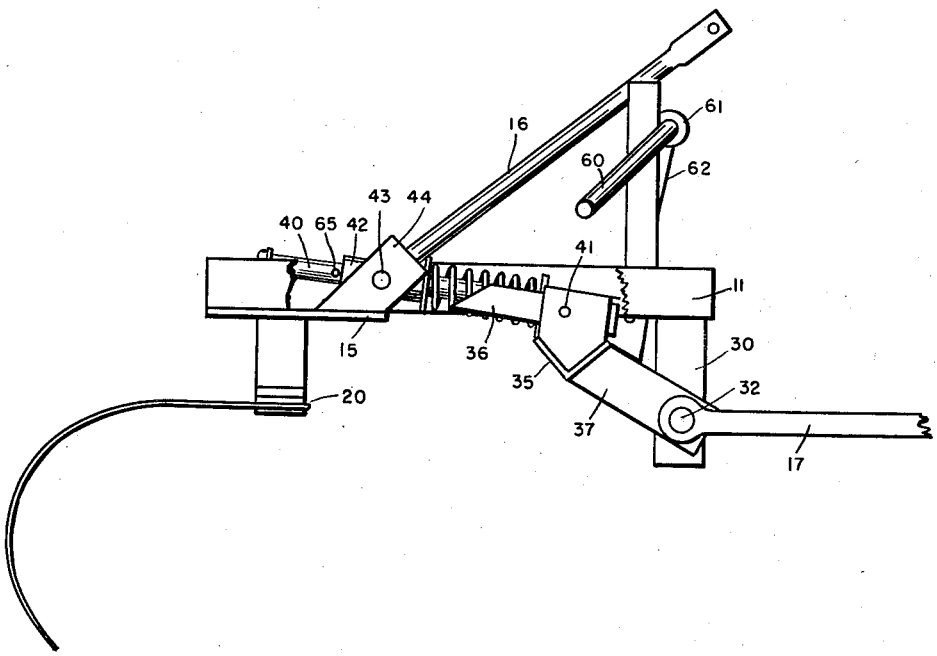
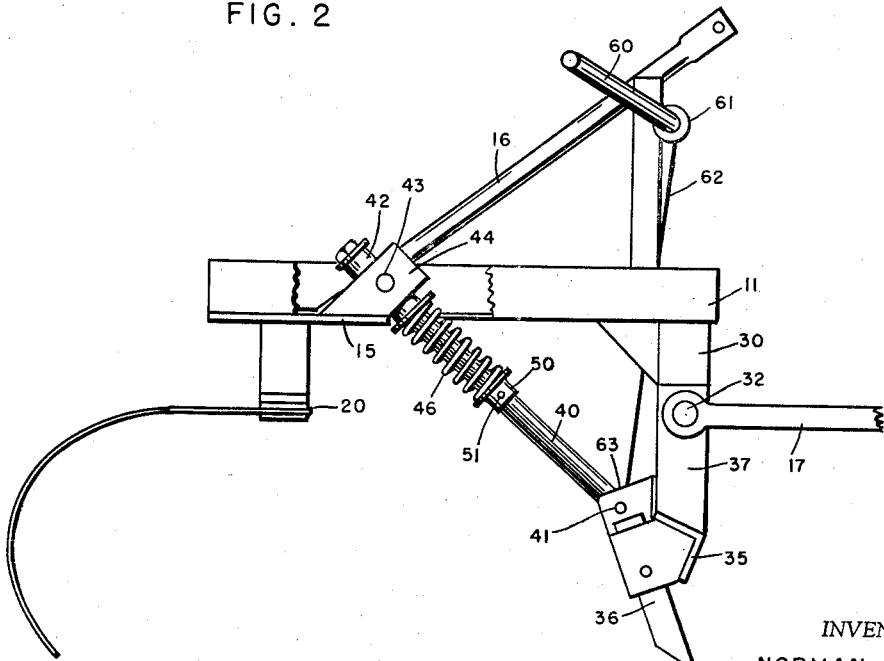
INVENTOR.
NORMAN COLE

INVENTOR.
NORMAN COLE
ATTORNEY

United States Patent Office 2,920,405
Patented Jan. 12, 1960

2,920,405

COMBINATION GRADING TOOL

Norman Cole, Webster, N.Y., assignor to York Modern Corporation, Unadilla, N.Y., a corporation of New York Application July 9, 1958, Serial No. 747,400

2 Claims. (Cl. 37—145)

This invention relates to earth working machinery and, more particularly, to earth grading attachments for tractors or the like.

In order to level or grade the earth to provide a desired contour or configuration, an earth and gravel rake may be attached to a suitable tractor and worked over the ground. Usually, the rake is supported or carried by a vertical pivot to permit pivoting of the rake for side delivery of raked material. The above-mentioned rake arrangements do not dig or loosen the earth to any extent and in order to prepare the earth for the desired leveling action of the rake, some form of scarification of the earth should be performed. Scarifiers comprised of a row or rows of spaced digging teeth to be pulled through the ground by a tractor are, of course, well known.

It is a principal object of this invention to provide a combination grading tool comprising both a scarifier and a grading rake to be hitched to a tractor as a single unit for use in a single operation to both prepare and level the earth.

Another object of the invention is to provide a combination rake and scarifier grading attachment for tractors which may be used as a grading rake only with the scarifier disabled in such manner that complete flexibility in the use of the rake is not interfered with even when the rake is pivoted to an extreme side discharge position.

Yet another object of the invention is to provide a combination pivotal rake and scarifier tractor attachment having a rugged yet simplified arrangement for resiliently urging the scarifier teeth into digging position and yet enabling the scarifier teeth to be easily raised from the digging position to a carried position not interfering with the pivotal movement of the rake.

According to the invention, a rake carrying frame member is adapted to be hitched to a tractor for suspension from the rear thereof. The rake member may be connected to the frame member by a vertical pivot connection. Also connected to the frame member by a horizontal pivot connection at a position between the rake and the tractor is a scarifier unit which may be resiliently urged into a digging position ahead of the rake in its movement over the ground. When desired, however, the scarifier may be moved upward about its horizontal pivot from the digging position to a carried position not engaging the ground and not interfering in the pivotal movement of the rake member.

Further objects, features, and advantages of the invention will be apparent with reference to the following specification and drawings in which:

Fig. 2 is a side elevation partly broken away to show the resilient connections for the scarifier and with the scarifier in the carried position;

Fig. 3 is a side elevation similar to Fig. 2 but with the scarifier in the resiliently urged digging position.

Figure 1:
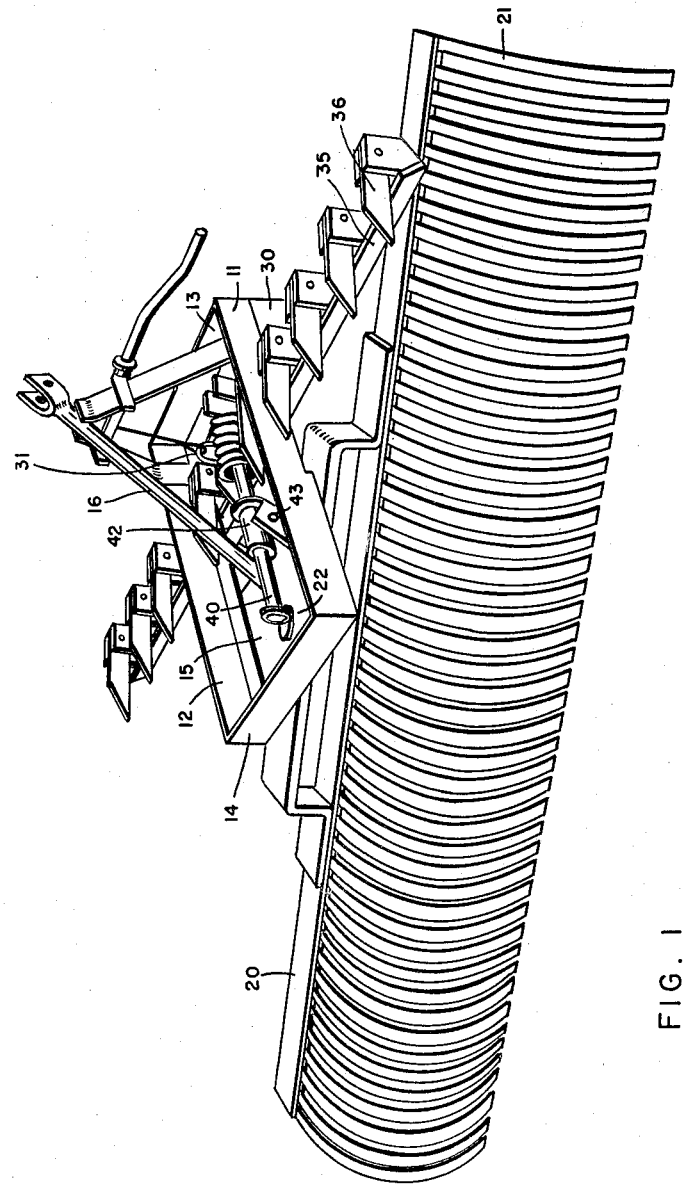
Fig. 1 is a perspective elevation with the rake shown to be pivoted to a side discharge position and with the scarifier raised in the carrying position.
Figure 4:
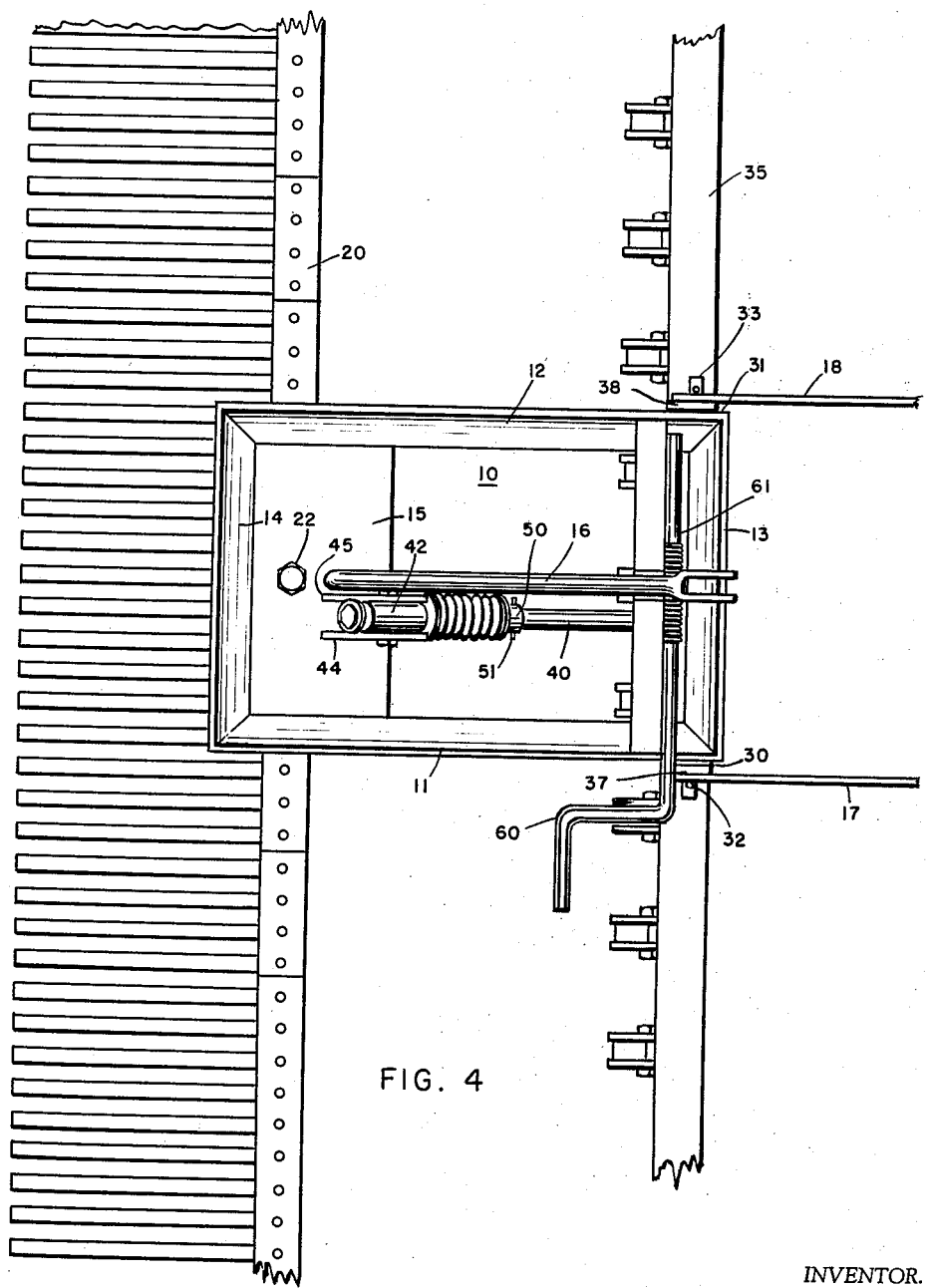
Fig. 4 is a top plan view of the central portions of the combined rake and scarifier combination grading tool of the invention.

Referring to the drawings, a rake carrying frame generally shown at 10 is formed of side rails 11, 12 and end rails 13, 14 together with a bottom plate member 15. The rake carrying frame may be connected to a tractor (not shown) by suitable tractor hitch drawbar members, such as shown at 16, 17, and 18, and they are arranged to support the frame 10 rearwardly of the tractor. If desired, additional wheeled supporting gear (not shown) may be provided to further support the rake carrying frame 10.

The earth rake 20 may have a plurality of aligned spring raking teeth, such as the tooth shown at 21. The rake 20 is connected by a vertical pivot pin 22 to the bottom plate 15 of the rake supporting frame 10 at the rearward end of the frame with respect to the tractor. As is clearly shown by Fig. 1 of the drawings, the rake 20 may be pivoted to a side discharge position when desired. Obviously, various detailed arrangements may be provided to pivot the rake to the desired position and maintain such pivoted position, but this invention is not concerned with such details and they are, therefore, not shown to simplify the description of the invention.

Extending downward from the forward end of the rake supporting frame 10 are scarifier support members 30, 31 to the lower ends of which the scarifier is pivotally connected by horizontal pivot pins 32, 33. The scarifier is comprised of a frame member 35 to which are attached a plurality of spaced scarifier teeth, such as shown at 36, which may have removable digging points if desired. The scarifier frame member 35 is connected by extensions 37, 38 to the pivot pins 32, 33, respectively, so that when the scarifier frame 35 is lifted to the carrying position, the frame 35 and scarifier teeth 36 will not interfere with the pivotal movement of the rake member 20, as shown in Figs. 1 and 2 of the drawings.

Considering the invention as thus far described, it will be apparent that the scarifier is carried by the rake supporting frame at a position between the tractor and the rake. The scarifier may be resiliently urged into the digging position shown by Fig. 3 of the drawings by means of the rod 40 pivotally connected at 41 to the scarifier frame 35. The other end of the rod 40 is slidably journalled in the sleeve 42 which is pivotally connected at 43 to projections 44, 45 of the plate member 15 of the rake supporting frame 10. A compression coil spring 46 is fitted between the sleeve 42 and the spring sleeve 50 that may be detachably connected to the rod 40 by means of the pin 51 in a manner to resiliently urge the scarifier 35 about the horizontal pivots 32 and 33 downward into the digging position.

When it is desired to raise the scarifier into the carried position shown by Figs. 1 and 2 of the drawings, the pin 51 may be removed, allowing the coil spring 46 to be disconnected so that the rod 40 may slide through the sleeves 42 and 50 as the scarifier 35 is raised. In order to raise the scarifier 35, a crank 60, cable drum 61, and cable 62 may be provided with one end of the cable 62 connected at 63 to lift the scarifier 35 as the cable is wound on the drum. Various locking means to hold the scarifier in the raised or carried position may be provided, such as the pin 65 (Fig. 2), which may be inserted through a suitable bore in the rod 40 to prevent the rod 40 from sliding through the sleeve 42 as required to lower the scarifier. Also, a ratchet (not shown) may be provided for the crank and cable drum which would hold the scarifier in the carried position if desired.

The operation of the rake and scarifier combination grading tool of the invention should now be readily apparent and need not be further described in detail. Various modifications may be made within the spirit of the invention and the scope of the appended claims.

What is claimed is:

1. A combination grading tool comprising, a rake supporting member, hitch means to mount said member on a tractor, a rake connected to said member through a vertical pivot to permit movement of the rake to side discharge positions, a scarifier connected through a horizontal pivot to said member in a position intermediate the rake and the tractor at a distance from said rake that would cause interfering engagement of said rake and said scarifier when said rake is pivoted to extreme side discharge positions and said scarifier is in digging position, resilient means connected between said member and said scarifier to normally urge said pivotally connected scarifier into a digging position, means to disconnect said resilient means, and means to move said scarifier about the horizontal pivot from the normal digging position to a carried position above the ground and above the upper surface of the rake.

2. A combination grading tool comprising, a rake supporting frame member, hitch means to mount said member on a tractor, a rake connected to said member by a vertical pivot to permit movement of the rake to side discharge positions, a scarifier connected through a horizontal pivot to said member in a position intermediate the rake and the tractor at a distance from said rake that would cause interfering engagement of said rake and said scarifier when said rake is pivoted to extreme side discharge positions and said scarifier is in digging position, and means to move and raise said scarifier about the horizontal pivot from a normal digging position to a carried position above the ground and above the upper surfaces of the rake.

References Cited in the file of this patent

UNITED STATES PATENTS

| | | |
|---|---|---|
| 857,833 | Ricketts | June 25, 1907 |
| 1,073,373 | Trompeter | Sept. 16, 1913 |
| 1,915,844 | York et al. | June 27, 1933 |
| 2,512,114 | Robinson et al. | June 20, 1950 |
| 2,736,252 | Latshaw | Feb. 28, 1956 |